United States Patent
Halberstadt

(10) Patent No.: US 7,417,876 B2
(45) Date of Patent: Aug. 26, 2008

(54) DETERMINING REFLECTED POWER

(75) Inventor: Johan Christiaan Halberstadt, Nijmegen (NL)

(73) Assignee: NXP B.V., Eindhoven (NL)

(*) Notice: Subject to any disclaimer, the term of this patent is extended or adjusted under 35 U.S.C. 154(b) by 470 days.

(21) Appl. No.: 10/561,580

(22) PCT Filed: Jun. 16, 2004

(86) PCT No.: PCT/IB2004/050919

§ 371 (c)(1),
(2), (4) Date: Dec. 19, 2005

(87) PCT Pub. No.: WO2004/112229

PCT Pub. Date: Dec. 23, 2004

(65) Prior Publication Data

US 2008/0130334 A1    Jun. 5, 2008

(30) Foreign Application Priority Data

Jun. 19, 2003   (EP) .................................. 03101815

(51) Int. Cl.
  *H02M 3/335*    (2006.01)
(52) U.S. Cl. ...................... 363/21.12; 363/98
(58) Field of Classification Search .................. 363/17, 363/20, 21.01, 21.12, 21.13, 21.15, 21.16, 363/95, 98

See application file for complete search history.

(56) References Cited

U.S. PATENT DOCUMENTS

| | | | |
|---|---|---|---|
| 6,069,804 A | 5/2000 | Ingman et al. | |
| 6,198,638 B1 | 3/2001 | Lee | |
| 6,992,902 B2 * | 1/2006 | Jang et al. | 363/17 |
| 7,180,758 B2 * | 2/2007 | Lincoln et al. | 363/56.01 |
| 7,212,419 B2 * | 5/2007 | Vinciarelli | 363/65 |

* cited by examiner

*Primary Examiner*—Adolf Berhane
(74) *Attorney, Agent, or Firm*—Peter Zawilski

(57) ABSTRACT

There is provided a switching circuit (50) comprising: a transformer (TR1) including at least one winding (P1, S1, S2); a switching device (FET1) coupled between a source of power (60) and the transformer (TR), the switching device (FETI) being coupled to a driving circuits (100) for periodically driving the switching devices (FET1) into conduction to transfer power from the source (60) to the inductive component (TRi). The circuit (50) further includes: a first monitoring arrangement (115) for determining a measure of a magnetizing current present in the transformer (TR1); a second monitoring arrangement for deriving a measure of hard switching occurring in the switching devices (FETI); and a signal processing arrangement (140, 150, 160, 170, 175) for generating a measure of reflected power being transferred through the transformer (TRI) from the measure of the magnetizing current and the measure of hard switching.

12 Claims, 4 Drawing Sheets

DETERMINING REFLECTED POWER

FIELD OF THE INVENTION

The present invention relates to a method of determining reflected power in switching circuits; in particular, but not exclusively, the invention relates to a method of determining reflected power in switching circuits such as bi-directional flyback converters and buck-type converters. Moreover, the invention also relates to switching circuits utilizing the aforesaid method, for example switch mode power supplies (SMPS).

BACKGROUND TO THE INVENTION

Switching circuits are well known, for example switch mode converters such as bi-directional flyback converters and buck-type converters are often employed in switch mode power supplies.

U.S. Pat. No. 6,069,804 describes a multi-output, multidirectional power converter. The converter includes an input bi-directional switch and at least a first output bi-directional switch. Moreover, the converter comprises a coupled inductor having an input winding and at least one output winding. The input winding is connected in series with an input voltage source and the input switch. Each output winding is connected in series with a corresponding output voltage source such as an associated capacitor and its respective output switch. Furthermore, the converter includes a clock circuit for generating binary-state control signals for driving the input and at least one output switches.

Similarly, U.S. Pat. No. 6,198,638 describes a flyback circuit for zero voltage switching (ZVS) in a continuous mode (CCM) and in a discontinuous mode (DCM), the circuit being adapted to reduce power loss associated with charging parasitic diodes of MOS transistors, for example MOSFETs, employed on a secondary side of the converter for providing synchronous rectification thereat. The circuit is distinguished in that it includes a synchronous rectifier driver operable to delay an associated gate driver signal outputted from a pulse width modulation part of the driver. Moreover, the driver is operable to invert the driver signal for reducing loss occurring at an instance of charging the aforesaid parasitic diodes of the secondary side for achieving substantially ZVS under fixed frequency operation in DCM.

SUMMARY OF THE INVENTION

A first object of the present invention is to provide a method of determining reflected power in a switching circuit. A second object of the invention is to provide a is to provide a method of determining reflected power in a switching circuit whilst circumventing a need for primary-side sensors. A third object of the invention is to provide a switching circuit capable of exhibiting reduced hard switching therein. The invention is defined by the independent claims. The dependent claims define advantageous embodiments.

The inventor has appreciated that it is feasible to determine an appropriate turn-on instance for a primary switch and/or a secondary switch in a bi-directional flyback converter, often referred to as a bidifly converter, using control signals derived from a secondary side of the converter. In particular, the inventor has appreciated that by measuring a magnitude of returned energy in such a converter, also referred to as reflected energy, it is possible to derive a control signal suitable for regulating a degree of primary side hard switching occurring in the converter; the magnitude of the returned energy in combination with hard switching detection is then useable to provide substantially soft switching in the converter. Additionally, the inventor has appreciated that such measurement of energy is beneficially based on switching current emulation which is potentially inexpensive to implement in practice and yet is susceptible to enhancing operating efficiency of the converter.

The invention is of advantage in that the method is capable of providing a more accurate indication of operation of the circuit, for example for use in control of its operation.

Preferably, the circuit further comprises feedback controlling means for receiving the measure of reflected power, and the method includes a further step of comparing the reflected power with a reference and regulating temporal operation of the driving means so that a predetermined degree of hard switching arises within the circuit in operation. By adopting a relatively low degree of hard switching, the method is capable of being applied to reduce dissipation arising within the circuit.

Preferably, when determining the measure of the magnetizing current present the inductive component, a current emulation is employed for generating the measure of the magnetizing current from a signal developed across said at least one winding. More preferably, the current emulation is arranged to utilize a temporal integration of the signal to generate the measure of the magnetizing current; use of such integration is capable of circumventing a need for in-line current sensing components. Yet more preferably, the temporal integration is periodically reset in synchronism with switching operation of the switching means; such resetting is capable of enhancing accuracy of the emulation.

Alternatively, the measure of the magnetizing current is preferably determined by including current sensing means (e.g. one or more of resistive current sensing means, Hall-effect current sensing means and inductively-coupled current sensing means) in series with said at least one winding. Preferably, the sensing means comprises a plurality of inductively-coupled sensors, each sensor being configured in series with its corresponding winding of the inductive component; inductively-coupled sensors are capable of resulting in less power dissipation in comparison to resistive current-sensing components. More preferably, current indicative signals generated by the plurality of sensors are summed together taking into account relative ratios of winding turns of their respective windings to generate the measure of the magnetizing current; such accommodation of the relative ratios of winding turns is capable of enabling a more accurate determination of the measure of the magnetizing current to be achieved. Yet more preferably, the current sensing means is implemented using at least one air-cored printed-circuit-board fabricated sensor; such air-cored sensors can be configured to be robust to interference, inexpensive to manufacture and provide extremely accurate current measurement.

Preferably, the feedback controlling means is operable to:

regulate the measure of hard switching in respect of a first reference;

regulate a difference of the measure of the magnetizing current and an hard-switching error signal with respect of a second reference, for purposes of regulating operation of the circuit, the error signal being derived from a difference between the measure of hard switching and the first reference.

More preferably, the second reference is a function of at least one of a voltage provided by the at least one source of power, a capacitance of the switching means, and an inductance presented by the inductive component. Such dependence of the second reference is capable of rendering a more accurate determination of the reflected power to be achieved.

It will be appreciated that features of the invention can be combined in any combination without departing from the scope of the invention.

DESCRIPTION OF THE DRAWINGS

Embodiments of the invention will now be described, by way of example only, with reference to the accompanying drawings wherein.

DESCRIPTION OF EMBODIMENTS OF THE INVENTION

In a conventional bi-direction flyback converter, namely a bidifly converter, there is often included an inductive transformer comprising a primary winding and at least one secondary winding. Moreover, it is also contemporary practice to include not only a primary switching device, for example a MOSFET, to cyclically and repetitively couple the primary winding to a principal source of power but also to include a secondary switching device, for example again a MOSFET, for providing synchronous rectification thereat. Furthermore, it is known when operating such a converter to maintain within each conduction cycle of the converter the secondary device conductive for a certain dwell time after magnetization current in the transformer has reached substantially zero magnitude. When the dwell time is employed, energy derived from circuits coupled to the at least one secondary winding is susceptible to being stored in the transformer for subsequent use for charging a drain-source capacitance of the primary switch to provide soft switching thereat, such soft switching being highly desirable in that it is susceptible to reducing power dissipation in the converter and thereby improving its operating efficiency. The inventor has appreciated that an amount of energy required to be stored in the transformer during each repetitive operating cycle of the converter for achieving softer switching is calculable from the voltage of the principal source of power, a secondary reflected voltage and a drain-source capacitance presented by the primary switching device at the primary winding.

Moreover, the inventor has appreciated that the energy stored in the transformer at the end of a bidifly stroke in the converter is determined by the total transformer current. In a simple situation where the converter is only provided with a single secondary winding, the transformer current is equivalent to the current flowing in this single winding. In a situation where there are at least two secondary windings, the inventor has identified that the transformer current is equivalent to a summation of currents in each of the at least two windings scaled by associated turns ratios for normalisation purposes.

Figure 1:
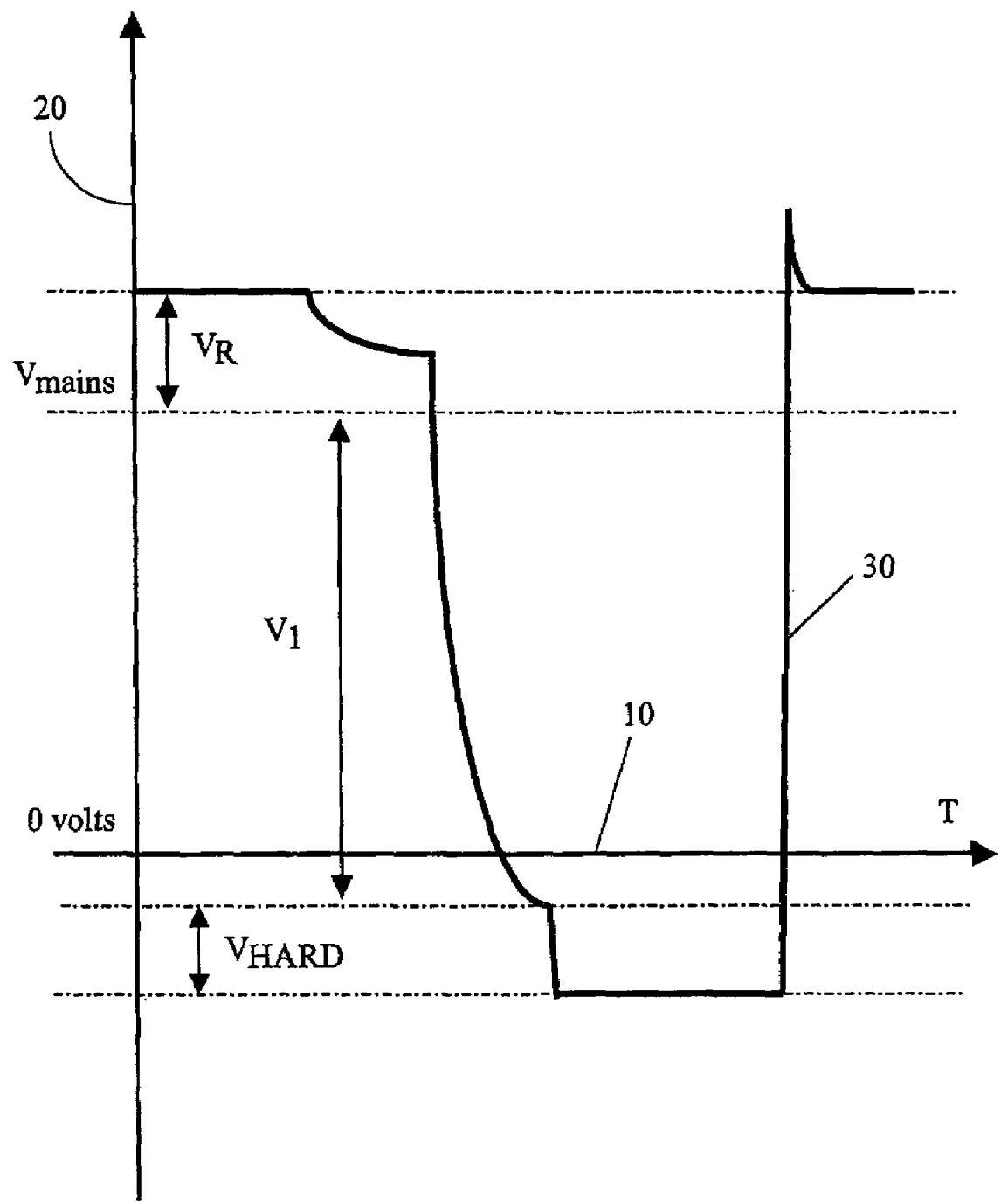
FIG. 1 is a graph of a cycle of primary switch conduction in a conventional bi-directional flyback converter wherein hard switching of limited amplitude arises in operation.

In a conventional bidifly converter of a type described in the foregoing, an instantaneous voltage developed at a drain electrode of a primary switching device FET1 of the converter is illustrated in FIG. 1. In FIG. 1, an abscissa axis 10 corresponds to time T, and an ordinate axis 20 corresponds to the aforesaid instantaneous drain electrode voltage. A potential difference $V_1$ shown is a difference between a supply voltage provided to the primary device and the device's drain voltage when the device is turned on, namely driven to a conducting state. Moreover, a potential $V_R$ is a reflected output voltage. Furthermore, a potential $V_{HARD}$ corresponds to an amplitude of hard switching occurring in the primary switch after it is turned on.

An approximate method of determining stored energy in a transformer of a bidifly converter including an associated primary switching device is to measure a current flowing in one secondary winding associated with the transformer, for example using a sense resistor, and comparing this current with a predetermined reference current $I_{neg}$; from knowledge of the stored energy, temporal switching of the primary device is susceptible to being accordingly adjusted to achieve approximately soft switching. A mathematical relationship, namely Equation 1 (Eq. 1), is then useable to determine a suitable value of the reference current $I_{neg}$ for achieving such substantially soft switching:

$$I_{neg} = \sqrt{\left(\frac{C}{L}\right)} \cdot \sqrt{(V_1^2 - V_R^2)} \qquad \text{Eq. 1}$$

wherein

C=a total drain capacitance exhibited in operation by the primary device; and

L=an inductance of the transformer referred towards the primary device.

The inventor has appreciated that the aforementioned approximate method has several problems associated therewith.

A first problem with the approximate method is that current flowing in a secondary winding must be sensed. A sense resistor is conveniently employed for economy but introduces a compromise between dissipation within the resistor, and hence its impact of the efficiency of the converter, and a conveniently small signal that is acceptably developed across the resistor for feeding into control circuits of the converter, for example with regard to accuracy and ambient circuit noise present in the converter arising as a consequence of its switching mode of operation.

A second problem is that, when the transformer includes at least two secondary windings and current is sensed in only one of the secondary windings, it is possible under certain conditions that a current flowing in a winding for which current sensing is not provided is not zero at a decision instance for turning off, namely to a non-conducting state, a secondary switch device incorporated into the converter. In such conditions, a value of the reference current $I_{neg}$ determinable from Equation 1 is inappropriate to achieve soft switching in the primary device. If a value for the reference current $I_{neg}$ from Equation 1 is adopted in such conditions, undesirable hard switching will arise in the primary device or the secondary device will be turned off too early. Such hard switching of the primary device and/or inappropriate control of the secondary device can result in the converter performing unsatisfactory, for example not being capable of delivering a desired load current at one or more of the secondary windings.

A third problem is that the reference current $I_{neg}$ is a function of the supply voltage elucidated in respect of the voltage $V_1$ in Equation 1. In order to enable the reference current $I_{neg}$ to be reduced to a relatively small value, a substantial potential on the secondary side referred to the primary winding has to be available for the converter. In order to provide such a substantial potential, additional circuit components are required which adds to converter manufacturing cost; moreover, the potential is beneficially of a magnitude to cope with worst-case situations with regard to fluctuations in the supply voltage. In practice, as a compromise, the converter desirably has a relatively large value for its reference current $I_{neg}$ resulting in an associated inconveniently large reactive current in the converter with associated elevated power dissipation.

In devising the invention, the inventor has been seeking to address a problem of identifying a method to determining reflected power in switching circuits, for example in a bidifly converter; the method is preferably implementable substantially without using sensing components to sense current. In order to address the problem, the inventor has developed a method involving the use of current emulation.

In current emulation, a voltage developed across one of the aforementioned transformer windings is integrated with respect to time t. Thus, the method is operable to emulate a current $I_L$ in an inductive component exhibiting an inductance L, for example a transformer or an inductor, by processing a measure of a voltage $U_L$ developed thereacross as provided in Equation 2 (Eq. 2):

$$I_L = \frac{1}{L} \cdot \int U_L dt \qquad \text{Eq. 2}$$

Similar considerations pertain to determining a voltage $U_C$ arising across a capacitor C by virtue of an associated current $I_C$ flowing therethrough as provided in Equation 3 (Eq. 3):

$$U_C = \frac{1}{C} \cdot \int I_C dt \qquad \text{Eq. 3}$$

In a simple circuit where the voltage $U_L$ developed across the inductor L is converted to a sense current by way of a resistor $R_1$ connected to the inductor L, and the capacitor is connected to the resistor $R_1$ to provide an integral of the sense current with time, the voltage $U_C$ developed across the capacitor is then describable by way of Equation 4 (Eq. 4):

$$U_C = \frac{1}{R_1 C} \cdot \int U_L dt \qquad \text{Eq. 4}$$

The voltage $U_C$ of Equation 4 is convertible to an emulation current $I_{EM}$ by connecting a resistor $R_2$ to the capacitor C, the current $I_{EM}$ being representative of the current $I_L$ and determinable according to Equation 5 (Eq. 5):

$$I_{EM} = \frac{1}{R_1 R_2 C} \cdot \int U_L dt \qquad \text{Eq. 5}$$

Thus, according to Equation 5, the emulated current $I_{EM}$ is derivable by monitoring the voltage $U_L$ and integrating it in respect of time t using a time constant corresponding to inductance of the inductor L, namely a time constant $\tau = R_1 . R_2 . C$ corresponds to the inductance L. However, it will be appreciated from application of Equation 5 alone that knowledge of $I_{EM}$, $R_1$, $R_2$, C does not enable $I_L$ to be determined unless a value for the inductance L is known.

In the context of switching circuits, for example switch mode converters and related apparatus, the inventor has appreciated that the emulation described by Equation 5 is susceptible to being applied for control of hard switching occurring in associated primary switching devices.

In the following, there will be considered a bidifly converter including a transformer whose primary winding is coupled to a mains supply via a primary switching device and whose secondary winding is coupled via a secondary switching device to a storage capacitor. Moreover, application of current emulation as elucidated in the foregoing in combination with such a supply will now be described.

At an instance where the primary device is turned on, namely switched to a conducting state, after the secondary device is turned off, namely switched to a non-conducting state, it is superficially-supposed that the transformer current is substantially zero at this instance, such an instance defining a moment when integration pursuant to Equation 5 can be commenced to obtain an emulation of current flowing in the transformer. In practice, a more complex situation pertains, namely current in the transformer is only of zero magnitude at a moment the primary device is switched on if a correct negative current were applied to a gate electrode of the secondary device.

In order to improve current emulation, the inventor has appreciated that it is highly advantageous to compare the emulated current with the sum of a predetermined negative level, for example an offset, and an adjustable level, a second offset, which will be elucidated later. Moreover, it is also beneficial to compare the emulated current with these at an instance the secondary switching device is switched off, namely switched to a non-conducting state. If a current in the secondary device is more negative than necessary, a drain voltage of the primary device will attain a substantially zero value and magnetizing current in the transformer will then not substantially be of zero magnitude; namely, there arises an absence of a "valley" conduction characteristic known in the art with regard to the primary switching device. The inventor has been able to simulate such a situation using computer-based circuit models.

The inventor has therefore appreciated that, for purposes of more precise switching control in the bidifly converter, an additional control loop is required to adapt the 2nd offset so that a valley conduction characteristic having associated therewith only a small amount of hard switching at the drain electrode of the primary switching device is achieved. On account of it being desirable to control hard switching of the primary device using signals derived from the secondary side of the converter, the inventor has devised a hard switching detection circuit operable to receive signals from a secondary winding of the converter's transformer. When the circuit is in operation, the amplitude of hard switching, said amplitude detected for the primary device from secondary side signals, is compared with a desired amplitude of hard switching to generate an error signal corresponding to a difference therebetween. The error signal is then beneficially subjected to integration and signal filtration for generating the 2nd offset. Beneficially, the 2nd offset is subtracted from the predetermined negative offset the generate a final signal for use in controlling the primary and/or secondary switching device. In consequence, the converter is operable, for example at initial energization, to regulate correctly bidifly currents flowing within the converter within a few switching cycles thereof.

The predetermined negative offset is substantially only included for purposes of ensuring that a sufficiently negative offset is provided at initial energization of the converter because the emulation current value requires several conduction cycles to settle and the primary switching device needs a drain voltage that is sufficiently low during conduction to indicate that a primary stroke is to be commenced. The negative offset is also susceptible to be of benefit to the converter because it is susceptible to rendering the converter more responsive for purposes of at least partially compensate for variations in input rectified mains supply presented to the primary switching device.

In order to further elucidate the method of the invention and also embodiments of the invention utilizing the method, embodiments of the invention will now be described with reference to FIGS. 2 to 4.

Figure 2:
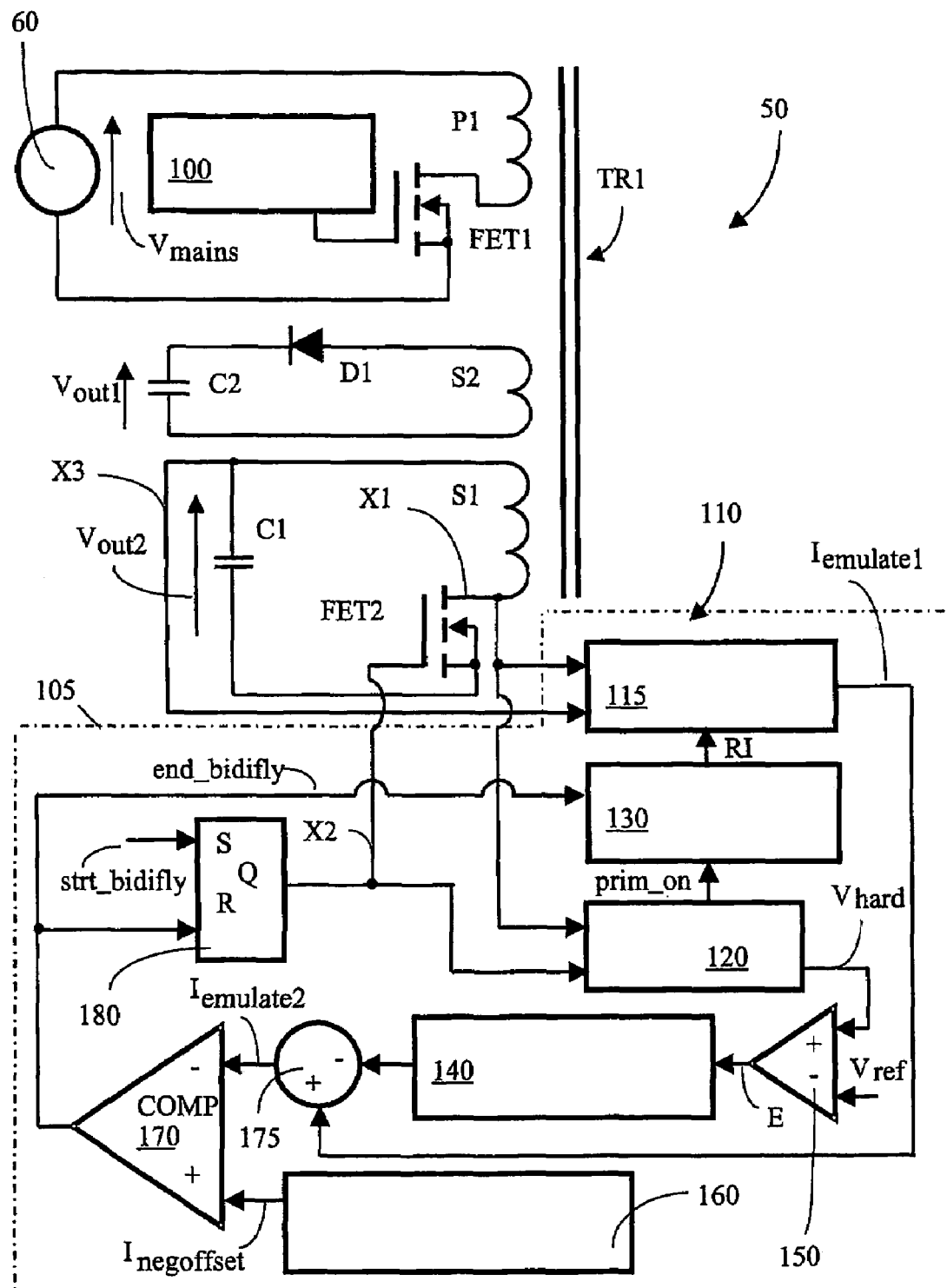
FIG. 2 is a schematic diagram of a first bidifly converter utilizing a current emulation method according to the invention.
Figure 3:
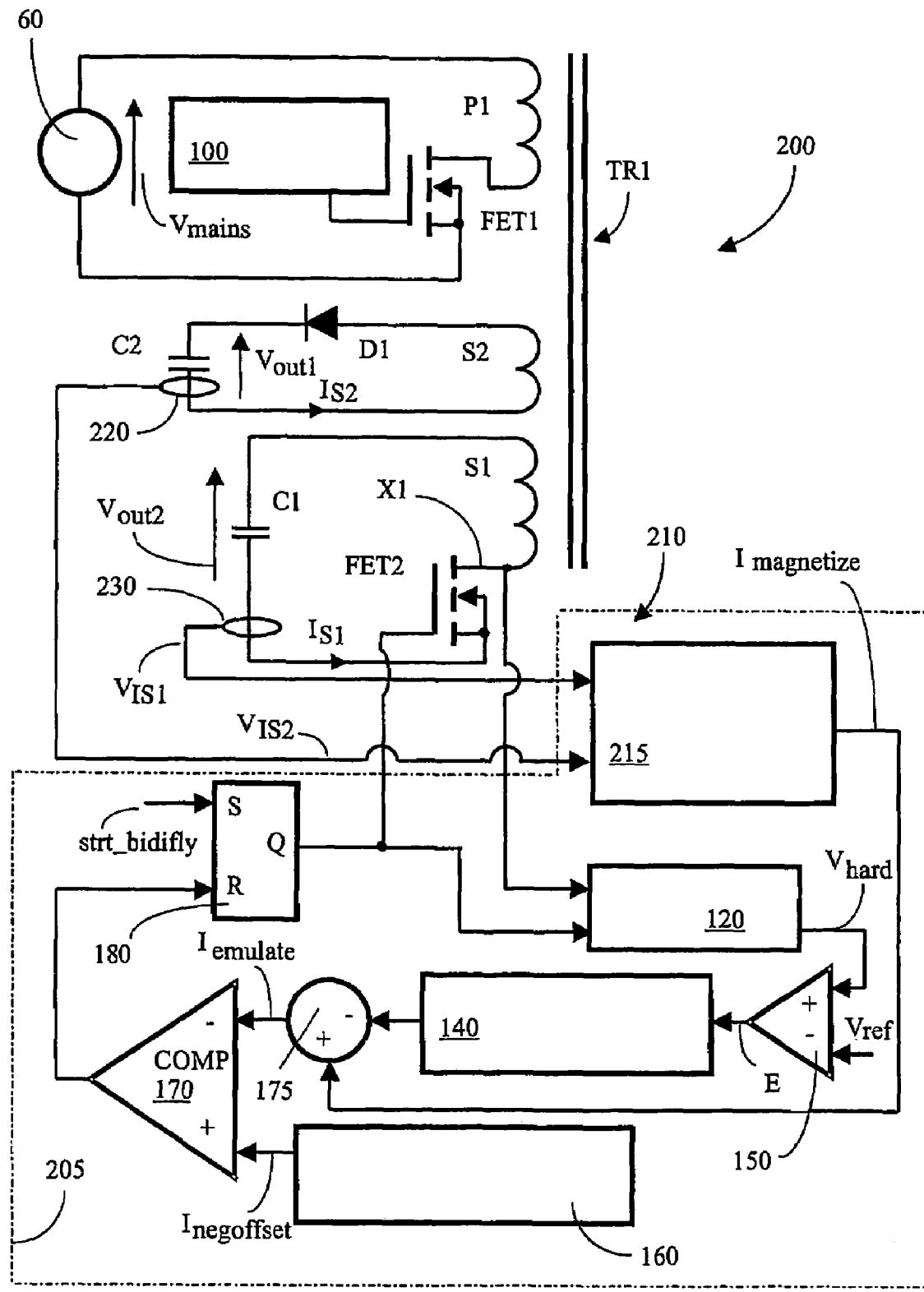
FIG. 3 is a schematic diagram of a second bidifly converter utilizing a current emulation method according to the invention, the bidifly converter including current sensors in each secondary circuit of the converter for measuring current flow therein.

In FIG. 2, there is shown a bidifly converter according to the invention indicated generally by 50. The converter 50 comprises a transformer indicated by TR1, for example a ferrite cored transformer, including a primary winding P1 and first and second secondary windings S1, S2 respectively wound thereonto. The windings P1, S1, S2 are preferable one or more of copper windings and metal foil windings, for example aluminium and/or copper foil windings. The primary winding P1 is connected via a primary switching device FET1 to a rectified mains supply 60 arranged to provide in operation a voltage $V_{mains}$ thereacross; a nodal point where a drain electrode of the device FET1 is connected to the first secondary winding S1 is denoted by X1. The primary device FET1 includes a gate electrode operable to control conduction between source and drain electrodes of the device FET1 in response to a control signal applied to the gate electrode; as illustrated, the device FET1 is connected at its gate electrode to a controller 100. Moreover, the second secondary winding S2 of the transformer TR1 is connected through a rectifier diode D1 to a storage capacitor C2; in operation, a voltage $V_{out1}$ is developed across the capacitor C2 as shown.

The first secondary winding S1 is coupled through a secondary switching device FET2 to a storage capacitor C1 as illustrated, there being developed in operation a voltage $V_{out2}$ across the capacitor C1 as shown; a nodal point whereat the winding S1 is connected to the capacitor C1 is denoted by X3 for later reference. The converter 50 is distinguished from the prior art in that it includes a first control circuit indicated generally by 110 and shown included within a dashed line 105. The first control circuit comprises an integrator 115, a hard switching detector 120, a reset circuit 130, a signal filter/integrator 140, an operational amplifier 150, a negative offset generator 160 for generating a reference current offset voltage $I_{negoffset}$, a comparator 170, a summing unit 175, and lastly a Set-Reset flip-flop 180.

The integrator 115 includes first and second inputs coupled to the nodal points X1, X3 across the first secondary winding S1. The integrator 115 is operable to integrate a potential difference presented to its inputs. Moreover, the integrator 115 includes a reset input RI coupled to a corresponding output of the reset circuit 130 as illustrated; the reset input RI is operable to reset integration within the integrator 115 to a zero condition at an instance magnetizing current in the transformer TR1 is also zero. The integrator 115 also includes an output $I_{emulate1}$ indicative by way of emulation of total magnetizing current present in the transformer TR1; the output $I_{emulate1}$ is coupled to a non-inverting unit of the summing unit 175 as illustrated. A drive output Q of the flip-flop 180 is coupled to a gate electrode of the secondary switch FET2, the output Q also being denoted by a nodal point X2. The nodal points X1, X2 are coupled to respective inputs of the hard switching detector 120, this detector 120 including a first output prim_on indicative of when the primary switching device FET1 is in a conductive state, and a second output $V_{hard}$ indicative of a magnitude of hard switching occurring in the primary device FET1. The output $V_{hard}$ is connected to a non-inverting input of the operational amplifier 150; an inverting input of the amplifier 150 is connected to a reference voltage $V_{ref}$. Moreover, the output prim-on is coupled to a corresponding input of the reset circuit 130. An output E of the operational amplifier 150 corresponds to an error signal. This output E is connected to a corresponding input of the filter/integrator 140. An output from the filter/integrator 140 is a second offset, namely as described in the foregoing, coupled to an inverting input of the summing unit 175. An output $I_{emulate2}$ from the unit 175 is coupled to an inverting input of the comparator 170. Similarly, an output $I_{negoffset}$ from the offset generator 160 corresponding to the aforementioned $I_{neg}$ is coupled to a non-inverting input of the comparator 170. In operation, the comparator 170 is operable to provide a binary logical output end_bidifly, namely exhibiting high and low logic states, which is coupled to a reset input R of the flip-flop 180 and also to an input of the reset circuit 130. A set input of the flip-flop 180 is connected to a timing generator (not shown) arranged to output a signal strt_bidifly indicative of when bidifly strokes are to be executed.

Operation of the converter 50 will now be described with reference to FIG. 2.

The integrator 115 is arranged to function in a manner as elucidated with reference to Equation 5 in the foregoing, namely the integrator 115 is operable to integrate a potential developed across the first secondary winding S1 in order to derive an emulation of current flowing therethrough, the emulation being denoted by $I_{emulate1}$. As described earlier, the integrator 115 is preferably reset to avoid drift therein and also temporally gated so as to integrate a desired portion of a cyclical potential developed across the winding S1. By processing a potential difference developed between the gate and drain electrodes of the secondary device FET2, the hard switching detector 120 is operable to determine a measure of hard switching occurring at the primary device FET1 in a manner as described in the foregoing. The amplifier 150 is operable as a control amplifier to regulate switching of the secondary device FET2 so as to try to match the voltage $V_{hard}$ with the reference voltage $V_{ref}$ to achieve a predetermined degree of hard switching. The error signal E is filtered and integrated in the filter/integrator 140 to generate the aforementioned 2nd offset signal. The output $I_{emulate2}$ from the summing unit 175 is then compared against the offset voltage $I_{negoffset}$ to control switching of the secondary device FET2 by way of the flip-flop 180. The value of the offset voltage $I_{negoffset}$ can be maintained at a constant value. Alternatively, the value of the voltage $I_{negoffset}$ can be made a function of at least one of the rectified mains voltage $V_{mains}$, a reverse voltage $V_{reverse}$, an inductance L exhibited by the transformer TR1 at its primary winding P1, and a capacitance C of the drain-source electrodes of the primary device FET1.

In overview, the integrator 115 is operable to derive a measure of magnetizing current in the transformer TR1 by way of emulation. The detector 120 is operable to derive the measure of hard switching $V_{hard}$ occurring in the primary device FET1. From the current emulation $I_{emulate1}$ in combination with the measure $V_{hard}$, the circuit is capable of determining a magnitude of reflected power stored within the transformer TR1 and thereby determine an error amount of reflected power necessary to be employed in the converter 50 in order to achieve a predefined degree of hard switching in its primary device FET1.

Thus, the first circuit 110 shown within the dotted line 105 is operable to perform the following functions:

(a) derive a measure of magnetizing current in the transformer TR1 by way of emulation, for example according to Equation 5 elucidated in the foregoing;

(b) from the secondary winding S1, derive a measure of hard switching occurring in the primary switching device FET1;

(c) derive a measure of reflected power occurring from the secondary side of the transformer TR1 to the primary side thereof; and (d) from the measure of reflected power, regulate switching of the primary device FET1 so as to achieve a predetermined degree of hard switching therein in operation.

The functions (a) to (d) are all capable of being achieved in the converter 50 without there being a need to provide sensing devices on a primary side of the transformer TR1. Moreover, utilization of these functions in the converter 50 is susceptible to increasing its operating efficiency, namely reducing dissipation arising therein.

It will be appreciated that the method of the invention is also susceptible to being applied to other converter configurations. For example, in FIG. 3, there is shown a second switch mode converter indicated generally by 200 utilizing the method of determining reflected power according to the invention. The converter 200 is similar to the converter 50 except that it includes first and second current sensors 230, 220 in series with the secondary windings S1, S2 respectively; moreover, the converter 200 includes a second control circuit indicated generally by 210 and shown included within a dotted line 205; the second circuit 210 is dissimilar in certain respects to the first circuit 110 employed in the converter 50. However, the second circuit 210 includes many of the same components as employed in the first circuit 110, namely the hard switching detector 120, the amplifier 150, the filter/integrator 140, the generator 160, the summing unit 175, the comparator 170 and the flip-flop 180.

In the converter 200, the primary winding P1 is coupled to the rectified mains supply 60 via the primary switching device FET1 in a similar manner to the converter 50. Similarly, the second secondary winding S2 is coupled via the diode D1 to the capacitor C2 in a similar manner to the converter 50 except that the second current sensor 220 is included to sense a current $I_{S2}$ flowing in the second secondary winding S2.

In the converter 200, the first secondary winding S1 is coupled via the secondary device FET2 to the capacitor C2 in a similar manner to the converter 50. However, the converter 200 additionally includes the first current sensor 230 for sensing a current $I_{S1}$ flowing through the first secondary winding S1.

The second circuit 210 comprises a summator and scalar unit 215 for receiving first and second current indicative output signals $V_{IS1}$, $V_{IS2}$ from the sensors 230, 220 respectively. The summator and scalar unit 215 includes an output $I_{magnetize}$ coupled to the non-inverting input of the summing unit 175, this output being indicative of total magnetizing current in the transformer TR1. The second circuit 210 comprises the hard switching detector 120 coupled at its first input to the nodal point X1 at the junction where the secondary switch FET2 is connected to the first secondary winding S1, and at its second input to the drive output Q of the flip-flop 180 which is coupled to the gate electrode of the second device FET2 as illustrated in FIG. 3. The hard switching indicative output $V_{hard}$ from the detector 120 is connected to a non-inverting input of the amplifier 150; moreover, the inverting input of the amplifier is coupled to the reference voltage $V_{ref}$. The error output E of the amplifier 150 is connected to the input of the filter/integrator 140 whose output is coupled to the inverting input of the summing unit 175 as shown. The output $I_{emulate}$ from the summing unit 175 is coupled to the inverting input of the comparator 170. In a similar manner to the converter 50, the non-inverting input of the comparator 170 of the converter 200 is connected to the generator 160 to provide a reference voltage $I_{negoffset}$ as described in the foregoing. The logic output from the comparator 170 is connected to the reset input R of the flip-flop 180; moreover, the set input S of the flip-flop 180 is connected to the signal strt_bidifly for controlling commencement of bidifly strokes.

The sensors 220, 230 are preferably inductively-coupled components, for example toroidal transformer-type components utilizing ferrite cores. Alternatively, the sensors 220, 230 can be implemented as air-cored devices when ultra-linear current sensing is required, for example using printed circuit board current sensing structures of a form as described in WO 02/082105A1 and WO 01/11376A1 which are herewith incorporated by reference in respect of their disclosure of air-cored current sensors.

Alternatively, one or more of the sensors 220, 230 can be implemented as solid-state Hall-effect devices, for example as surface mounting components (SMPs) suitable for printed circuit board assembly, placed in close proximity to conductors conveying currents flowing in the two secondary windings, for example conveyed along circuit board copper tracks. As a further alternative, one or more of the sensors 220, 230 are susceptible to being implemented as sensing resistors where a voltage developed thereacross is indicative of corresponding current flow through its associated secondary winding of the transformer TR1.

The summator and scalar unit 215 in combination with the sensors 220, 230 are operable to sum measures of the currents $I_{S1}$, $I_{S2}$ taking into account relative current measuring sensitivities of the sensors 220, 230 and also relative turns ratio of the two secondary windings S1, S2. If required, the summator and scalar unit 215 can be dispensed with by arranging for the current sensors 220, 230 to exhibit current measuring sensitivities to take into account a relative winding ratio of the two secondary windings S1, S2 and connecting the sensors 220, 230 then in series to generate the signal $I_{magnetize}$.

In operation, the summator and scalar unit 215 generates the signal $I_{magnetize}$ indicative, as described earlier, of the total magnetizing current present in the transformer TR1. Moreover, the hard switching detector 120 is operable to derive, from potentials developed at gate and drain electrodes of the secondary device FET2, the signal $V_{hard}$ indicative of hard switching occurring at the primary switch FET1. The second circuit 210 is thereby from the signal $V_{hard}$ and the current $I_{magnetize}$ capable of deriving a measure of reflected power arising in the converter 200. This measure is compared at the comparator 170 with the offset voltage $I_{negoffset}$ from the generator 160 to influence temporal switching at the secondary device FET2 so as to achieve a predetermined magnitude of hard switching in the primary device FET1. Although the converter 200 does not employ emulation of magnetizing current in the transformer TR1 on account of employing actual total current measurement by way of the sensors 220, 230, it does however derive a measure of reflected energy occurring in the converter 200 for purposes of regulating its operation.

The method of the invention for determining reflected power is also applicable to other types of converter other than bidifly converters described in the foregoing. For example, in FIG. 4, there is shown a buck-type converter indicated generally by 300. The converter 300 includes a transformer TR2 having wound thereon a single winding 305 denoted by "F" having first and second terminals. Moreover, the converter 300 additionally comprises the rectified mains supply 60 operable to generate a voltage $V_{mains}$ across the first and second switching devices FET1, FET2 as illustrated. A junction Y1 between the devices FET1, FET2 is connected to the first terminal of the winding F. The second terminal of the winding F is coupled to a first electrode of the capacitor C1. Moreover, a second electrode of the capacitor C1 is coupled to a junction Y2 where the second switching device FET2 is coupled to the mains supply 60. A control unit 310, for example implemented using a flip-flop amongst other associated components (not shown), is connected to the first switching device FET1 as illustrated.

The buck-type converter 300 is distinguished in that it further comprises a third control circuit indicated by 315 and shown included within a dashed line 320. The circuit 315 includes the aforementioned integrator 115, the hard switching detector 120, the reset circuit 130, the filter/integrator 140, the amplifier 150, the offset generator 160, the comparator 170, the summing unit 175 and the flip-flop 180.

Figure 4:
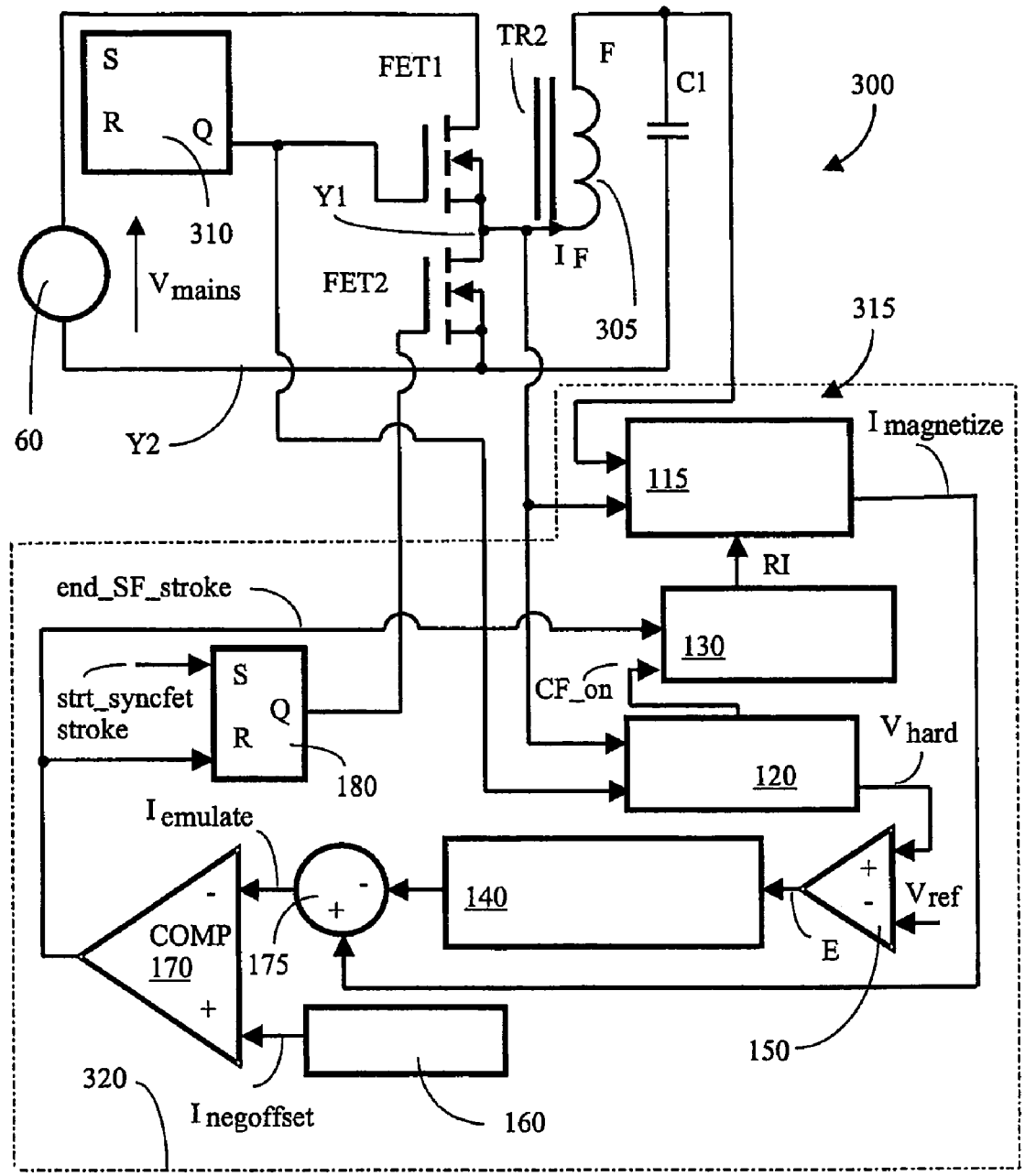
FIG. 4 is a schematic diagram of a third buck-type converter including current emulation features, the converter utilizing a current emulation method according to the invention.

Component parts of the circuit 315 are connected together as shown in FIG. 4. Namely, the integrator 115 is coupled at its two inputs across the winding F; moreover, the reset input of the integrator 115 is connected to a corresponding output RI of the reset circuit 130. Similarly, the hard switching detector 120 is coupled at its two inputs to the gate electrode of the first switching device FET1 and to the junction Y1 respectively. A $V_{hard}$ output from the detector 120 is, in operation, indicative of a magnitude of hard switching occurring in the first device FET1; this output $V_{hard}$ is coupled to the non-inverting input of the amplifier 150 as shown. The inverting input of the amplifier is coupled to the voltage reference $V_{ref}$. An output E from the amplifier 150 is coupled through the filter/integrator 140 to the inverting input of the summing unit 175. The comparator 170 is connected at its inverting input to the output $I_{emulate}$ of the summing unit 175, and at its non-inverting input to the reference generator 160 arranged to provide a substantially constant reference voltage $I_{negoffset}$. The comparator 170 is arranged to provide a logic output which is coupled to the reset input R of the flip-flop 180 and to an input of the reset circuit 130. A start stroke generator (not shown) is coupled to the set input S of the flip-flop 180 for providing a signal strt_jsyncfet_stroke thereto for indicating commencement of conduction strokes in the switching devices FET1, FET2. The flip-flop 180 is coupled at its Q output to the gate electrode of the second switching device FET2 as illustrated.

Operation of the buck-type converter 300 will now be described with reference to FIG. 4. The controller 310 provides an output signal at its Q output for cyclically driving the first device FET1 into a conductive state, also known in the context of the invention as a "stroke". When the first device FET1 is switched on, namely switched to a conducting state, the circuit 315 maintains the second device FET2 off, namely in a non-conducting state, to avoid directly shorting the rectified supply 60 through the devices FET1, FET2. Conduction through the first device FET1 causes a current $I_F$ to flow through the winding F causing a magnetic field to be established within the transformer TR2. When the first device FET1 is subsequently switched off, namely switched to a non-conducting state, the second device FET2 is switched on, namely switched to a conducting state, thereby enabling the magnetic field established in the winding F to collapse to charge the capacitor C1 via the second device FET2. Such a conduction cycle as described is then repeated periodically.

Control signals applied to the gates of the devices FET1, FET2 are arranged to try to reduce hard switching occurring in the devices FET1, FET2 and thereby reduce dissipation in the converter 300. Moreover, the control signals are also arranged to reduce disturbances to an output potential developed across the capacitor C1.

In order to generate the aforementioned control signals in the converter 300, the circuit 315 is operable to determine a magnitude of reflected power arising within the converter 300 and to adjust drive to the second device FET2 accordingly. The integrator 115 is arranged to integrate a voltage developed across the winding F to determine, by way of application of aforementioned Equation 5, an emulated measure $I_{magnetize}$ of the current $I_F$ flowing therethrough. The reset circuit 130 is operable to reset the integrator 115 periodically, as described in the foregoing, to ensure that the emulated current measurement provided by the integrator 115 is as desired. By monitoring a voltage developed between the gate and source electrodes of the first device FET1, the hard switching detector 120 is operable to derive a measure of hard switching occurring within the first device FET1.

The amplifier 150 is arranged to function as a control amplifier to try to maintain a predetermined degree of hard switching in the converter 300, the predetermined degree being dependent on the value of the voltage $V_{ref}$ presented to the amplifier 150. The error signal E generated by the amplifier 150 is integrated in the filter/integrator 140 to generate the second offset signal which is subtracted from the emulated current $I_{magnetize}$ to generate the signal $I_{emulate}$ for use in the comparator 170 relative to the reference voltage $I_{negoffset}$ from generator 160 to control switch-off of the second device FET2. The circuit 315 is, by virtue of its operation, capable of determining a measure of reflected power in the converter 300 and using this measure in a feed-back mode to control temporal operation of the devices FET1, FET2 for achieving a pre-determined degree of hard switching within the converter 300. Preferably, the pre-determined degree of hard switching corresponds to a reduced degree of hard switching for rendering the converter 300 more efficient than corresponding contemporary known converters.

It will be appreciated that embodiments of the invention described in the foregoing are susceptible to being modified without departing from the scope of the invention. It will further be appreciated that reference to the singular in the foregoing should be construed as also relating to the plural. Moreover, expressions such as "comprise", "contain", "include", "have", "has" should be construed as being non-exclusive to the presence of other items. In the claims, any reference signs placed between parentheses shall not be construed as limiting the claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of determining reflected power in a switching circuit, the circuit comprising an inductive component including at least one winding, and switching means coupled between at least one source of power and said at least one winding wherein the switching means is further coupled to driving means for periodically driving the switching means into conduction to transfer power from the at least one source to the inductive component, the method including the steps of:

determining a measure of a magnetizing current present in the inductive component;

deriving a measure of hard switching occurring in the switching means;

determining a measure of reflected power being transferred through the inductive component from the measure of the magnetizing current and the measure of hard switching.

2. A switching circuit comprising:

an inductive component including at least one winding switching means coupled between at least one source of power and said at least one winding, the switching means being coupled to driving means for periodically driving the switching means into conduction to transfer power from the at least one source to the inductive component;

first monitoring means for determining a measure of a magnetizing current present in the inductive component;

second monitoring means for deriving a measure of hard switching occurring in the switching means; and processing means for generating a measure of reflected power being transferred through the inductive component from the measure of the magnetizing current and the measure of hard switching.

3. A circuit according to claim 2, wherein the circuit further comprises feedback controlling means for comparing the measure of reflected power with a reference and for regulating temporal operation of the driving means so that a predetermined degree of hard switching arises within the circuit in operation.

4. A circuit according to claim 2, wherein the first monitoring means are operable to determine the measure of the magnetizing current present in the inductive component by way of emulation from a signal developed across said at least one winding.

5. A circuit according to claim 4, wherein the first monitoring means are operable to utilize a temporal integration of the signal to generate the measure of the magnetizing current.

6. A circuit according to claim 5, wherein the temporal integration is periodically reset in synchronism with switching operation of the switching means.

7. A circuit according to claim 2, wherein the first monitoring means include current sensing means in series with said at least one winding for generating the measure of the magnetizing current.

8. A circuit according to claim 7, wherein the sensing means comprises a plurality of sensors, each sensor being configured in series with its corresponding winding of the inductive component.

9. A circuit according to claim 8, wherein current indicative signals generated by the plurality of sensors are summed together taking into account relative ratios of winding turns of their respective windings to generate the measure of the magnetizing current.

10. A circuit according to claim 3, wherein the feedback controlling means are arranged to:

regulate the measure of hard switching in respect of a first reference;

regulate a difference of the measure of the magnetizing current and an hard switching error signal with respect if a second reference, for purposes of regulating operation of the circuit, the error signal being derived from a difference between the measure of hard switching and the first reference.

11. A circuit according to claim 10, wherein the second reference is a function of at least one of a voltage provided by the at least one source of power, a capacitance of the switching means, and an inductance presented by the inductive component.

12. A circuit according to claim 2 adapted for a bi-directional flyback converter, the converter being arranged so that its inductive component is a transformer including a primary winding for connection via the switching means to the source of power, and at least one secondary winding, the measure of the magnetizing current and the measure of hard switching being generated from signals arising in operation in the at least one secondary winding.

* * * * *